United States Patent Office 3,533,947
Patented Oct. 13, 1970

3,533,947
USE OF ADAMANTANE POLYMERS AS VI IMPROVERS
Irl N. Duling, West Chester, Pa., and Maryellen Hoagland, Wilmington, Del., assignors to Sun Oil Company, Philadelphia, Pa., a corporation of New Jersey
No Drawing. Filed Sept. 12, 1968, Ser. No. 759,506
Int. Cl. C10m 1/26
U.S. Cl. 252—57                    6 Claims

ABSTRACT OF THE DISCLOSURE

Poly(adamantylacrylates) give greater VI improvement than the same concentration of other polymer VI improvers of the same molecular weight. For example, poly(dimethyl adamantylacrylate) (DMAA) having a molecular weight of 80,000 (number average) at a concentration of 1.0% (volume) in oil gave a VI of 133 and a viscosity ratio of 1.10 whereas almost 2.0% of a commercial mixed polymethacrylate of 117,000 molecular weight would be required for this same improvement. A direct comparison of a 1.0% concentration of these same two polymers shows that DMAA produces a 30.4% increase base oil VI whereas the mixed polymethacrylate increased base oil VI only 20.6%.

---

The present invention relates to petroleum oil compositions having improved viscosity index (VI).

The viscosity index of lubricating oil can be improved by a number of means. One method is the extraction of aromatic hydrocarbons from petroleum lubricating oils, e.g., by solvent extraction to produce a raffinate having high viscosity index. Another method is the addition to the petroleum oil of a viscosity index (VI) improver.

A large variety of materials have been employed as VI improvers, for example, polyisobutylenes, poly(alkylstyrenes) and polymethacrylates.

Of the various types of VI improvers known and used, polymethacrylates hold a position of prominence.

It has now been found that adamantyl polyacrylates improve the viscosity index of mineral lubricating oil. The adamantyl polyacrylates of the invention of a particular molecular weight (number average) have VI improving ability equivalent to known polymethacrylates of much higher molecular weight. For example, a mineral petroleum oil composition containing 1.0% of the adamantyl polyacrylate of 80,000 molecular weight gave a relative viscosity (RV) at 100° F. of 1.19, at 210° F. of 1.21 and a viscosity ratio (VR) of 1.10 whereas a previously known and commercially available polymethacrylate [1] required a molecular weight in the range of 117,000 to achieve the same improvement at the same concentration, thus giving the polyadamantyl acrylate greater shear stability.

The shear ratio (SR) at 210° F. for the composition according to the invention containing adamantyl poly-

---

[1] HF 855—Product of Rohm & Haas Co., polymethacrylates of alcohols including long chain fatty alcohols, i.e., lauryl, stearyl, butyl, cetyl and hexyl.

acrylate was 0.97 and for the commercial polymethacrylate of 117,000 molecular weight 0.96.

An additional benefit to be derived from the compositions of the present invention is that a separate pour point depressant is not needed since the instant polyacrylates also exhibit this property. Although some prior polymethacrylates also are pour point depressant, these are not necessarily the same ones as are suitable VI improvers.

Other functional materials can be employed in the instant compositions including, other VI improvers, thickeners, pour point depressants, corrosion inhibitors, antioxidant, antisquawk agents, foam inhibitors and the like.

The preparation of adamantyl polyacrylates is shown in the copending application of Duling et al., Ser. No. 625,581, filed Mar. 24, 1967.

Briefly stated, the present invention is a composition comprising petroleum mineral oil containing a viscosity index improving amount of a poly(adamantyl-acrylate) having the repeating structure

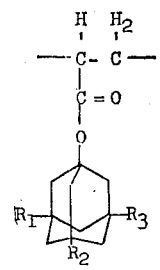

where $R_1$ and $R_2$ are radicals having 0–20 carbon atoms selected from the group consisting of hydrogen, alkyl and cycloalkyl, and $R_3$ is a radical having 1–20 carbon atoms selected from the group consisting of alkyl and cycloalkyl.

Adamantane (tricyclo[3.3.1.1$^{3,7}$]decane) has a carbon structure containing ten carbon atoms arranged in a completely symmetrical, strainless manner and is often described as a cage-like structure which consists of three condensed cyclohexane rings. There are four bridgehead carbon atoms which are equivalent to each other as are the rings. The adamantane structure is often depicted by:

the preferred polyacrylates employed in the invention have the formula

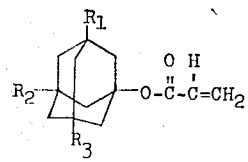

$R_1$ and $R_2$ are radicals having 0–20 carbon atoms selected from the group consisting of hydrogen, alkyl and cycloalkyl, and $R_3$ is a radical having 1–20 carbon atoms selected from the group consisting of alkyl and cycloalkyl. In this preferred class of products, the adamantane nucleus thus has one, two or three hydrocarbyl substituents located at bridgehead positions, which substituents are alkyl, cycloalkyl or combinations thereof.

The above-defined acrylate esters are useful as monomers for preparing solid polymers which can be either homopolymers or copolymers with other vinyl monomers. Such polymers can be made by polymerizing or copolymerizing the foregoing esters by free radical catalysis in conventional manner. The polyacrylates employed in the present invention are the homopolymers of the esters as defined above and have repeating units giving a structure corresponding to the formula

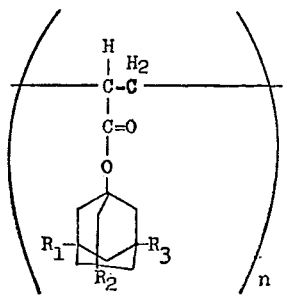

where $n$ represents the number of such repeating units. The presence of the bulky adamantyl groups along the polymer chain gives extraordinarily high glass transition temperatures for the polymers and imparts high temperature stability characteristics as discussed hereinafter.

The monomer esters can be prepared by reacting acrylic acid or more preferably the acid chloride, with an adamantyl monool of the formula AOH where A is an adamantane moiety having 1–4 alkyl or cycloalkyl substituents, each having 1–20 carbon atoms, and the hydroxyl groups is attached to A at a bridgehead position. Substituted adamantyl monools or alcohols for making the prepared esters correspond to the formula

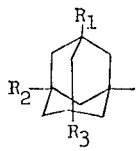

wherein the several R groups are as previously defined. These alcohols, in which all alkyl groups are at bridgehead positions, can be prepared from mono-, di- or trialkylated adamantane hydrocarbons corresponding to the alkyl or cycloalkyladamantyl moiety desired in the product. While the number of carbon atoms in each alkyl or cycloalkyl group can vary widely ranging, for example, up to 20, it is usually preferable that these groups be methyl and/or ethyl since the parent hydrocarbons corresponding thereto are more readily obtainable. Thus, the alkyladamantyl moiety, i.e.,

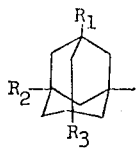

desirably is selected from the following: 1-methyladamantyl; 1,3 - dimethyladamantyl; 1 - ethyladamantyl; 1-methyl - 3 - ethyladamantyl; 1,3,5-trimethyladamantyl; and 1,3-dimethyl-5-ethyladamantyl.

The adamantyl alcohols used for making esters according to the invention can also have one or more of the R groups positioned at non-bridgehead positions of the adamantane nucleus. Thus, the A group in the alcohol can be an adamantane nucleus having from one to four alkyl and/or cycloalkyl substituents attached thereto at non-bridgehead positions or at both non-bridgehead and bridgehead positions. Examples of these less preferred alcohols for practicing the invention are as follows: 2-methyladamantanol-1; 4-methyladamantanol-1; 4-ethyladamantanol-1; 2,5-dimethyladamantanol-1; 2,4-dimethyladamantanol-1; 4-methyl-3-ethyladamantanol - 1; 2,4,6-trimethyladamantanol-1; 2,4,5,7-trimethyladamantanol-1; and 2,3,4-trimethyl-7-ethyladamantanol-1; and higher molecular weight adamantanols corresponding to the foregoing but having higher alkyl and/or cycloalkyl radicals in place of one or more of the methyl or ethyl substituents.

Preparation of the parent hydrocarbons corresponding to alkyl or cycloalkyladamantane moieties as above specified can be carried out by aluminum halide or HF-BF$_3$ catalyzed isomerization of saturated tricyclic hydrocarbons, as disclosed by Schleyer et al., Tetrahedron Letters No. 9, pp. 305–309 (1961) and Schneider et al., JACS, vol. 86, pp. 5365–5367 (1964), and in U.S. Pats. Nos. 3,128,316 and 3,275,700. Higher alkyl or cycloalkyl groups can be substituted on the adamantane nucleus by a Wurtz synthesis involving reacting bridgehead chloro- or bromoadamantanes with alkali metal alkyls or cycloalkyls in the manner disclosed by Spengler et al., Erdöl und Kohle-Erdgas-Petrochemie, vol. 15, pp. 702–707 (1962). Other procedures of making alkyl- or cycloalkyl-substituted adamantanes are described in Schneider U.S. application Ser. No. 613,443, filed Feb. 2, 1967, now Pat. No. 3,382,288, and in an article by Hoek et al., 85 (1966) Recueil 1045–1053. The alkylated adamantanes can, for the present purpose, have either non-branched or branched alkyl groups and can have one or more cycloalkyl radicals in the alkylation moiety with the total number of carbon atoms in each group substituted on the adamantane nucleus ranging up to twenty. Preferably these substituents contain no tertiary hydrogen atoms.

It is also preferable that at least one of the $R_1$ and $R_2$ groups be alkyl or cycloalkyl so that the substituted adamantyl moiety will contain not more than one unsubstituted bridgehead position. This renders the product less susceptible to oxidation. For best oxidation resistance, both $R_1$ and $R_2$ are alkyl or cycloalkyl groups so that the nucleus has no tertiary hydrogen substituent.

The starting alkylated adamantane hydrocarbon is first converted to a 1-monool for use as reactant in preparing the present esters. One manner of effecting such conversions is by air oxidation of the parent hydrocarbons at, for example, 160° C. in the presence of a metal salt oxidation catalyst, as disclosed in Schneider U.S. application Ser. No. 395,557, filed Sept. 10, 1964 now Pat. No. 3,356,740, issued Dec. 5, 1967. In the oxidation, monools form first and these will subsequently convert to diols, if the reaction is allowed to continue too far. Some amounts of ketones are also formed during the oxidation. Production of the monools can be maximized by stopping the oxidation before 70% conversion has been reached.

Another way of preparing 1-monools of the substituted adamantanes is by reacting the latter with an acetic acid solution of chromic acid, as disclosed in Moore U.S. application Ser. No. 421,614, filed Dec. 28, 1964 now abandoned. By using a relatively low mole ratio of Cr to hydrocarbon, such as 3:2, good yields of the monool can be obtained.

Preparation of the ester product can be accomplished by known esterification methods. One method comprises refluxing a mixture of acrylic acid and the alkyladamantyl alcohol dissolved in a suitable solvent such as benzene, toluene or heptane in the presence of an esterification catalyst such as p-toluene sulfonic acid, and trapping out water from the reflux condensate as the esterification reaction proceeds.

The preferred esterification procedure involves reacting the alkyladamantyl alcohol with acrylyl chloride in accordance with the following equation:

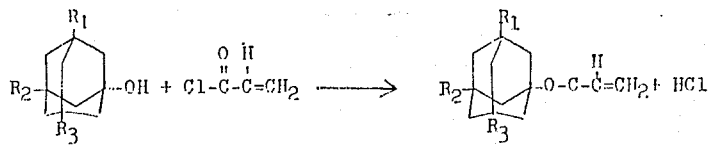

This reaction is carried out by dissolving the alcohol in a hydrocarbon solvent such as benzene, toluene, hexane, heptane or the like, adding a tertiary amine to the mixture in molar excess relative to the alcohol, and then slowly adding the acid chloride thereto. The amine used preferably is triethylamine, although other tertiary amines such as pyridine, tributylamine, N,N,N′,N′-tetramethylethylenediamine, triethylenediamine, picolines, quinoline and the like can be employed. Upon addition of the acid chloride, the initial reaction that takes place involves the formation of a complex between it and the amine. This reaction is exothermic and the complex precipitates as it is formed. Slow addition of the acid chloride is continued preferably until the amount added is in molar excess of the alcohol. The resulting slurry is then stirred at a temperature in the range of 10–80° C., more preferably 20–60° C., to effect the esterification reaction. A temperature above 80° C. should be avoided in most instances as this tends to cause a messy reaction, and it is most preferable to maintain the temperature at 25–50° C. Time required for completion of the reaction will depend upon the reaction temperature used, but generally is in the range of 1–20 hours.

As the reaction occurs the amine-acid chloride complex is replaced by an amine-HCl complex which is also insoluble in the hydrocarbon solvent. The alkyladamantyl-acrylate product on the other hand remains in solution. After completion of the reaction, the mixture is filtered to remove the amine-HCl complex and the solvent is removed by evaporation. The crude product ester obtained as residue is a reddish liquid. This can be purified by vacuum distillation, after addition of a polymerization inhibtor such as bis(2-hydroxy-3-t-butyl-5-methylphenyl)-methane, to give a sweet smelling, colorless liquid as the desired ester product.

The alkylated adamantane acrylates prepared as above described can be polymerized in a conventional manner by free radical catalysis using a free radical initiator such as hydrogen peroxide, benzoyl peroxide, dicumyl peroxide, di-t-butylperoxide or azobisisobutyronitrile. Procedures for polymerizing and copolymerizing acrylates are well known and need not be elaborately described here. Discussion of such procedures are given in Encyclopedia of Chemical Technology; vol. 1, 2nd ed. (1963), pps. 303–311.

The polymerization reaction preferably is carried out employing a solvent such as benzene or toluene at elevated temperatures such as 50–80° C. The acrylate monomer is dissolved in the solvent, a small amount as 0.05–1.0% of the free radical initiator is added to the mixture, the mixture is degassed and then heated to and maintained at the selected temperature level until the desired degree of polymerization has been attained. The polymer, which remains in solution, can then be recovered in conventional manner by adding an antisolvent such as methanol, separating the precipitated polymer and drying.

The acrylate monomers can also be polymerized to high molecular weight polymers by means of anionic catalysts. This kind of catalysis for making polymers from other types of acrylates has been described in various literature references and similar conditions for anionic polymerization of the present monomers can be used. Examples of anionic catalysts which have been employed are: Grignard reagents such as alkyl or phenyl magnesium bromide [Garrett et al., JACS, 81, 1007–1008 (1959), and Gaylord et al., Linear and Stereospecific Addition Polymers, 531 (1959)]; butyllithium or fluorenylsodium [Graham et al., JACS, 82, 2100–2103 (1960)]; sodium naphthalene [Graham et al., J. Poly, Sci., 44, 411–419 (1960)]; and lithium dispersions [Miller et al., JACS, 80, 4115–4116 (1958)]. These and other known anionic catalysts can be used for converting the present monomers to polyacrylate resins of high molecular weight.

Resins made from the alkyladamantyl or cycloalkyl-adamantylacrylates of the present invention have extraordinarily high glass transition temperatures by virtue of the bulky adamantyl groups appended along the polymer chain. These resins accordingly have high softening points permitting their use at relatively high temperatures.

The unusually high glass transition temperatures ($T_g$) of the present polymers can be seen by comparison with $T_g$ values reported in the literature for conventional polyacrylates and polymethacrylates. Typical $T_g$ values for conventional polymers are given in Encyclopedia of Chemical Technology, loc. cit., p. 308, by Krause et al., J. Poly. Sci., 3, 3573–3586 (1965) and Miller, Polymer Handbook, Interstate Pub., N.Y. 1966, pp. 66–69. For polyacrylates made from various alkyl esters, these references show $T_g$ values ranging from $-80°$ C. (for n-octyl) to 94° C. (for isobornyl). In comparison, $T_g$ values found for the homopolymers made from the bridgehead acrylate of 3,5-dimethyladamantanol-1 typically are 100–107° C.

Still another advantage of poly(adamantyl-acrylates) results from the stability of the adamantane nucleus as mentioned above. Ester groups made from conventional alcohols of two or more carbon atoms can undergo thermal decomposition by transfer of a hydrogen atom from the beta position of the alcohol-derived moiety in the following manner:

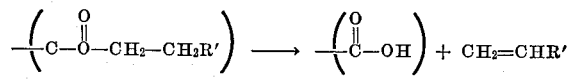

This type of decomposition results, as shown, in the conversion of the ester group to a carboxylic acid group and an olefin. While prior art acrylate resins can undergo this type of decomposition at high temperature, resins made from the present ester products cannot as this would require the formation of a double bond in the adamantane nucleus which, as previously stated, cannot occur.

Adamantyl methacrylates and poly(adamantylmethacrylates) can also be prepared by the processes described above, however, the adamantylmethacrylate polymers were not operable in the present invention, since they were not found to be sufficiently soluble in the petroleum mineral oil.

Number average molecular weights given herein were determined by membrane osmometry. Osmometric determination of polymer molecular weights involves the measurement of osmotic pressure of polymer solution at various concentrations. Reduced pressure is then plotted against concentration and extrapolated to zero concentration. From this value number average molecular is calculated by the equation:

$$\overline{M}_n = \frac{RT}{\pi/c}$$

$\overline{M}_n$=number average molecular weight
$R$=gas constant
$T$=temperature
$\pi/c$=reduced osmotic pressure In the case of poly(adamantylacrylates), however, the plots were not linear and extrapolation of a fitted line or the high concentration linear portion of the curve yielded inconsistent results. In order to overcome this problem, parabolic curves were fitted to the points and value of the reduced pressure at the minimum of this curve was the value used for $\pi/c$ in the molecular weight calculation. This approach has some obvious theoretical deficiencies, since normally, it would be expected that the lowest pressure reading would be at zero concentration. However, because of the unexplained deviant behavior of the poly(DMAA) the lowest value is observed at some finite concentration, and this minimum is the one used to obtain consistent results.

Generally suitable poly(DMAA) useful for the compositions of the present invention have molecular weights in the range of 50,000 to 300,000.

Poly (DMAA) has exhibited viscosity ratio (VR) in range of 0.90–1.16 at concentrations of from 0.25–4 volume percent of the total composition. Viscosity ratio is calculated by:

$$VR = \frac{\log RV\ 210°\ F.}{\log RV\ 100°\ F.}$$

where $$\text{relative viscosity}(RV) = \frac{\text{Vis of blend}}{\text{Vis of base oil}}$$

The addition of more than 2 volume percent of poly(DMAA) to petroleum mineral oils is not useful because the VR in these cases is less than one. For similar reasons, no less than about 0.20 volume percent of poly(DMAA) is preferred. It appears that a concentration of 1 volume percent at all molecular weight levels is most efficient in regard to VR. However, the higher concentrations of poly(DMAA) do result in higher VI's.

The type of oil employed is not critical and any petroleum mineral oil will operate in the instant compositions, for example, those classified generally as paraffinic, naphthenic, aromatic or mixtures of these oils, which can be derived from any of the conventional sources.

Viscosity index (VI) was calculated by ASTM D–2270. In order to determine the shear stability of the compositions of the invention, some samples were subjected to severe shear tests and VI measured again. These tests were conducted in accordance with the "Proposed Method of Test for Shear Stability of Polymer-Containing Oils," ASTM Standards on Petroleum Products and Lubricants, Appendix XII (1961), and in a 10-kc. magnetostrictive shear device at 84% power for eleven minutes at room temperature.

The compositions of the present invention are prepared by dissolving a weighed amount of poly(DMAA) (that amount necessary to obtain the final desired volume percent polymer in solution) in a minimum volume of pure benzene. The benzene solution was then added to a measured volume of the base oil, and mixed thoroughly. The benzene was then stripped off under vacuum leaving behind a solution of poly(DMAA) in the oil.

The following examples are specific illustrations of the invention:

EXAMPLE 1

This illustrates the preparation of 3,5-dimethyl-1-adamantylacrylate by the reaction of 3,5-dimethyl-1-admantanol (DMAO) with acrylyl chloride. 10 g. of DMAO (0.055 mole) were dissolved in a mixture of 75 ml. of benzene and 5 ml. of pyridine (0.062 mole). Acrylyl chloride in amount totaling 5.4 g. (0.06 mole) was added dropwise over a time of 0.5 hour while the mixture was stirred and cooled. A complex between the acrylyl chloride and pyridine precipitated, forming a slurry. The mixture was stirred for 6 hours at room temperature to complete the reaction. The pyridine-HCl complex that had been formed was separated by filtering the mixture, and solvent was evaporated from the filtrate leaving a reddish liquid residue. This was shown by vapor phase chromatography and IR analysis to be mainly 3,5-dimethyl-1-adamantylacrylate. To the crude product was added a small amount of a polymerization inhibitor, viz. bis(2-hydroxy-3-t-butyl-5-methylphenyl) methane, and the mixture was then vacuum distilled to give 6 g. of pure 3,5-dimethyl-1-adamantylacrylate. This product was a colorless, sweet-smelling liquid having the following properties:

Boiling point _____ 65° C. @ 0.15 mm. Hg
Density, 20°/4° _____ 1.0255
Refractive index 20°/D _____ 1.4873
Refractive dispersion @ 20° _____ 104
    Hydrogen red line _____ 1.4847
    Hydrogen blue line _____ 1.4951
KV @ 100° F., cs. _____ 7.2

EXAMPLE 2

The same ester as in Example 1 was again prepared, but using acrylic acid instead of the acid chloride. A solution of 12.01 g. of acrylic acid and 9.98 g. of DMAO (acid:alcohol molar ratio=3:1 in 250 ml. of toluene was prepared and 0.5 g. of p-toluene sulfonic acid was added as esterification catalyst. The mixture was then refluxed and water formed in the reaction was trapped out of the condensate. After 28 hours 0.5 g. more of the catalyst was added and refluxing was continued for a total time of 72 hours. The reaction mixture was then washed with aqueous $Na_2CO_3$ and dried, and the solvent was evaporated. The residue was distilled and a fraction (5.12 g.) of substantially pure 3,5-dimethyl-1-adamantylacrylate having essentially the same properties as given in Example 1 was obtained.

Comparison of reaction times for Examples 1 and 2 shows that esterification of the DMAO is more readily achieved by using the acrylyl chloride rather than acrylic acid.

EXAMPLE 3

In this example DMAO was reacted with methacrylyl chloride to produce 3,5-dimethyl-1-adamantylmethacrylate. More specifically 27 g. (0.15 mole) of DMAO were dissolved in 200 ml. of benzene, 65 ml. (0.47 mole) of triethylamine were added and 30 ml. (0.31 mole) of methacrylyl chloride were added dropwise to the mixture while cooling and stirring. The mixture was then stirred overnight to insure completion of the reaction. Triethylamine and HCl formed were removed by washing the mixture successively with water, aqueous NaOH and water, following which the mixture was dried over $MgSO_4$. A small amount of free radical inhibitor was added, the solvent was distilled off and the reaction product was then vacuum distilled to recover the methacrylate ester. This product was a colorless liquid having a slight sweet odor and the following properties:

Boiling point _____ 90° C. @ 0.50 mm. Hg
Density, 20°/4° _____ 1.004
Refractive index, 20°/D _____ 1.4890

EXAMPLE 4

This example illustrates the preparation of polymer from 3,5-dimethyl-1-adamantylacrylate. The reaction was carried out in a dried container which had been carefully purged with nitrogen to exclude air. The reaction mixture consisted of 1.0 g. of the acrylate product prepared in Example 1 and 5 ml. of benzene to which had been added 0.003 g. of benzoyl peroxide as a free radical initiator 1-adamantylmethacrylate. The resulting polymer was insoluble in the base oil employed in Examples 14–18.

TABLE I.—PREPARATION OF POLY(DIMETHYLADAMANTYLACRYLATES)

| Ex. No. | Initiator, percent | Reaction time, hrs. | Polymer yield, percent | R.I. 20/D | Inherent viscosity [1] | Density, 20/4 | M.P., °C. (capillary) | $T_g$, °C. |
|---|---|---|---|---|---|---|---|---|
| 5 | BP (0.12) | 64 | 72 | | 0.65 | | 200 d. | >100 |
| 6 | BP (0.10) | 42 | 50 | 1.504–1.508 | 1.48 | | d. >280 | 100 |
| 7 | BP (0.26) | 19 | 68 | 1.508 | 0.39 | 1.04 | | >100 |
| 8 | BP (0.36) | 19 | 50 | 1.496 | 0.47 | 1.02 | [3] 290 d. | >100 |
| 9 | BP (0.37) | 17 | 71 | 1.496 | 0.50 | | d. >245 | >100 |
| 10 | AIBN (0.10) | 65 | 98+ | 1.504 | 0.26 | | d. >280 | 105 |
| 11 | AIBN (0.08) | 40 | 98+ | 1.508–1.512 | 0.60 | | d. >280 | 104 |
| 12 (Polymethacrylate) | AIBN (0.09) | 40 | 71 | [2] 1.508–1.512 | 0.90 | 1.046 | | 199 |

[1] In benzene at 100° F. and concentration of 0.5 g./100 ml. of benzene.
[2] Sample was birefringent.
[3] Softens >170.

(0.3% by weight based on the monomer). The mixture was heated to and maintained at 65° C. for 16 hours, resulting in a viscous solution of polymer in benzene. This solution was poured into absolute methanol to precipitate the polymer, which was separated, dried and pulverized to yield a white amorphous powder. Properties of this poly(dimethyladamantylacrylate) product were as follows:

Molecular weight ($\overline{M}_n$ by osmometry) _____ 141,000
Density (20°/4°) _____ 1.014
Inherent viscosity (in benzene @ 100° F.) _____ 0.35
Glass transition temperature ($T_g$) _____ 100° C.
Refractive index (20°/D) _____ 1.50

EXAMPLES 5–12

A series of polymerization runs was made with 3,5-dimethyl-1-adamantylacrylate as the monomer, benzene as solvent and a reaction temperature of about 60° C. In each example a solution of 1.0 g. of the monomer in 4–5 ml. of benzene containing a small amount of initiator was prepared and the mixture was degassed by freezing and evacuation. The degassed mixture was heated under nitrogen to 60° C. and maintained at that temperature for times as shown in Table I. In Examples Nos. 5–9 the initiator was benzoyl peroxide (designated "BP") and in Example Nos. 10–11 azobiisobutyronitrile ("AIBN"), the proportions of initiator being shown in Table I. After the reaction, the polymer was precipitated from solution, separated and dried. Typically the polymer thus obtained is a white powder which when heated and molded gives a clear, colorless article. Also typically, all of these polyacrylates have glass transition temperatures ($T_g$) of 100° C. or above.

In Example 12, the poly(dimethyl-adamantylmethacrylate) [poly(DMAMA)] was prepared from 3,5-dimethyl-

EXAMPLES 13 AND 14

Two examples were made at 25° C., using monomers derived from DMAO and without any added initiator, by ultraviolet (UV) light irradiation of solutions of the monomers at concentrations of 0.20–0.25 g./ml. of solvent. Data for these examples are shown in Table II. In each case the final reaction mixture before addition of antisolvent (methanol) was a viscous solution except that in Example No. 14 a portion of the polymer was insoluble.

TABLE II.—PHOTO-INITIATED SOLUTION POLYMERIZATIONS

| Ex. No. | Monomer | Solvent | Reaction time, hrs. | Polymer yield, percent | Inherent viscosity [1] |
|---|---|---|---|---|---|
| 13 | Acrylate | Chloroform | 18 | 98+ | 0.20 |
| 14 | do | Cyclohexane | 18 | 80 | 0.38 |

[1] In benzene at 100° F. and concentration of 0.5 g./100 ml. of benzene.

EXAMPLES 15–19

The poly(adamantyl acrylates) oil compositions employed in Examples 15, 16, and 17 were prepared by dissolving 1.0955 grams of the various molecular weight poly(adamantyl-acrylates) in 5–10 cc. of benzene. The polymers are soluble at room temperature. To this benzene solution was added 24 cc. of oil by pipet. The mixture was then stripped of benzene under pressure. The resulting composition contained 4.0% by volume of the poly(adamantyl-acrylate). The other concentrations were obtained by dilution with base oil. The oil employed in Examples 15–19 is a paraffinic oil having a viscosity at 100° F. of 100–115 SUS, VI of 102, API gravity at 60° F. of 32.0–34.0 and pour point of 0° F.

Comparison showings are presented with two commercial VI improvers with the same base oil, i.e., within the range of permissible variations for different production runs. The commercial products are available as concentrates which can be blended directly into the base oil.

TABLE III

| Sample Description | Percent conc.[1] | Percent polymer [2] | $KV_{100}$ (cs.) | $KV_{210}$ (cs.) | VI (ASTM) | $RV_{100}$ | $RV_{210}$ | VR | Shear ratio |
|---|---|---|---|---|---|---|---|---|---|
| Base oil | | | 23.54 | 4.36 | 102 | | | | |
| 15—Poly(DMAA)$\eta_{inh}$=0.26 MW=80,000 (Example 10) | | | | | | | | | |
| | | 4.0 | 50.96 | 8.78 | 164 | 2.16 | 2.01 | 0.90 | |
| | | 2.0 | 34.44 | 6.27 | 146 | 1.46 | 1.44 | 0.96 | |
| | | 1.0 | 28.07 | 5.27 | 133 | 1.19 | 1.21 | 1.10 | |
| Before shear | | 1.0 | | 5.21 | | | 1.20 | | |
| After shear | | | | 5.05 | | | 1.16 | | 0.97 |
| 16—Poly(DMAA)$\eta_{inh}$=0.60 MW=150,000 (Example 11) | | | | | | | | | |
| | | 3.8 | 75.02 | 12.81 | 184 | 3.19 | 2.94 | 0.93 | |
| | | 1.5 | 37.18 | 6.78 | 154 | 1.58 | 1.56 | 0.97 | |
| | | 0.75 | 29.31 | 5.39 | 132 | 1.25 | 1.24 | 0.97 | |

| Sample Description | Percent conc.[1] | Percent polymer [2] | $KV_{100}$ (cs.) | $KV_{210}$ (cs.) | VI (ASTM) | $RV_{100}$ | $RV_{210}$ | VR | Shear ratio |
|---|---|---|---|---|---|---|---|---|---|
| 17—Poly(DMAA)$\eta_{inh}$=1.48 MW=285,000 (Example 6) | | | | | | | | | |
| | 4.0 | | 382.01 | 60.14 | [5] 238 | 16.23 | 13.79 | 0.94 | |
| | 2.0 | | 102.25 | 18.65 | 214 | 4.34 | 4.28 | 0.99 | |
| | 1.0 | | 52.37 | 11.01 | 221 | 2.22 | 2.53 | 1.16 | |
| Before shear | 0.5 | | 33.70 | 6.56 | 166 | 1.43 | 1.50 | 1.13 | |
| After shear | | | 26.02 | 4.87 | 121 | 1.11 | 1.12 | 1.09 | 0.74 |
| Before shear | | | 29.33 | 5.53 | 141 | 1.25 | 1.27 | 1.07 | |
| After shear | | | 25.22 | 4.66 | 111 | 1.07 | 1.07 | 1.00 | 0.84 |
| 18—Rohm & Haas HF 855* $\eta_{inh}$=0.15 [3] MW=117,000 [4] | | | | | | | | | |
| | 5.0 | 2.75 | 37.94 | 7.05 | 162 | 1.59 | 1.64 | 1.07 | .90 |
| | 4.0 | 3.20 | 34.60 | 6.41 | 152 | 1.45 | 1.48 | 1.09 | .92 |
| | 3.0 | 1.65 | 31.73 | 5.81 | 139 | 1.33 | 1.35 | 1.05 | .93 |
| | 2.0 | 1.10 | 28.87 | 5.25 | 126 | 1.21 | 1.22 | 1.09 | .96 |
| 1.0 | | .55 | 26.25 | 4.77 | 111 | 1.10 | 1.11 | 1.09 | .98 |
| 19—Rohm & Haas HF 747* $\eta_{inh}$=0.34 [3] MW=355,000 [4] | | | | | | | | | |
| 6.0 | | 2.54 | 41.52 | 8.00 | 181 | 1.74 | 1.86 | 1.12 | .89 |
| 5.0 | | 2.10 | 37.94 | 7.27 | 172 | 1.59 | 1.69 | 1.13 | .90 |
| 4.0 | | 1.68 | 34.60 | 6.62 | 162 | 1.45 | 1.54 | 1.16 | .92 |
| 3.0 | | 1.26 | 31.73 | 5.89 | 144 | 1.32 | 1.37 | 1.13 | .94 |
| 2.0 | | .84 | 28.87 | 5.33 | 131 | 1.21 | 1.24 | 1.13 | .96 |
| 1.0 | | .42 | 27.48 | 4.82 | 113 | 1.11 | 1.12 | 1.09 | .98 |

[1] Volume percent concentrate blended into base oil.
[2] Actual percent polymer in blend.
[3] Intrinsic viscosity determined in n-heptane at 30° C.
[4] Viscosity average molecular weight calculated from: $[\eta]=3.4 \times 10^{-5} M^{.72}$.
[5] Calculated values.
* Trademark Rohm & Haas Co.
Shear ratio = $RV_{210}$ after shear/$RV_{210}$ before shear.

The invention claimed is:

1. A composition comprising petroleum mineral oil in major amount containing a viscosity index improving amount of a poly(adamantyl-acrylate) having a molecular weight of between about 50,000 and 300,000 and having the repeating structure

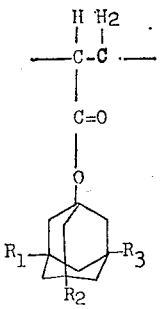

where $R_1$ and $R_2$ are radicals having 0–20 carbon atoms selected from the group consisting of hydrogen, alkyl and cycloalkyl, and $R_3$ is a radical having 1–20 carbon atoms selected from the group consisting of alkyl and cycloalkyl.

2. A composition according to claim 1 wherein $R_1$ and $R_2$ are selected from the group consisting of hydrogen, methyl and ethyl and $R_3$ is selected from the group consisting of methyl and ethyl.

3. A composition according to claim 2 wherein the adamantyl moiety is selected from the group consisting of 1-methyladamantyl; 1,3-dimethyladamantyl; 1-ethyladamantyl; 1-methyl-3-ethyladamantyl; 1,3,5-trimethyladamantyl; and 1,3-dimethyl-5-ethyladamantyl.

4. A composition according to claim 1 wherein the poly(adamantylacrylate) is present in the range of 0.20 to 4 volume percent.

5. A composition according to claim 4 wherein the poly(adamantylacrylate) is present in the range of 0.20 to 2.0 volume percent.

6. A composition according to claim 4 wherein the poly(adamantylacrylate) is poly(3,5-dimethyl-1-adamantyl-acrylate).

References Cited

UNITED STATES PATENTS

| | | | |
|---|---|---|---|
| 3,243,416 | 3/1966 | Caldwell et al. | 260—85.5 |
| 3,282,844 | 11/1966 | Borchert et al. | 252—57 |
| 3,342,880 | 9/1967 | Reinhardt | 260—648 |
| 3,398,165 | 8/1968 | Duling et al. | 252—57 |

DANIEL E. WYMAN, Primary Examiner

W. H. CANNON, Assistant Examiner

U.S. Cl. X.R.

260—89.5